United States Patent [19]
Rogers

[11] Patent Number: 5,257,140
[45] Date of Patent: Oct. 26, 1993

[54] MIRROR FOR INFRARED AND VISIBLE WAVELENGTH RADIATION

[75] Inventor: James E. Rogers, Woodland Hills, Calif.

[73] Assignee: Hughes Aircraft Company, Los Angeles, Calif.

[21] Appl. No.: 374,220

[22] Filed: May 3, 1982

[51] Int. Cl.[5] ............................................. G02B 5/28
[52] U.S. Cl. ................................... 359/884; 359/589; 359/723; 372/99
[58] Field of Search ............... 350/290, 164, 300, 166; 372/99; 106/56; 264/1.9; 156/101, 256; 161/35; 359/359, 589, 590, 723, 884; 356/414; 351/213

[56] References Cited

U.S. PATENT DOCUMENTS

| | | | |
|---|---|---|---|
| 3,645,600 | 2/1972 | Doctoroff et al. | 359/723 |
| 3,698,928 | 10/1972 | Blome | 350/166 |
| 3,753,822 | 8/1973 | Heinrich | 350/166 |
| 3,792,914 | 2/1974 | Sarna | 359/884 |
| 3,858,046 | 12/1974 | Catalehini | 359/589 |
| 4,147,409 | 4/1979 | Apfel | 372/99 |
| 4,229,066 | 10/1980 | Rancourt et al. | 350/164 |
| 4,320,936 | 3/1982 | Sawamura | 359/590 |
| 4,408,825 | 10/1983 | Stalmoeh | 359/589 |
| 4,441,789 | 4/1984 | Pohlack | 350/166 |

FOREIGN PATENT DOCUMENTS

| | | | |
|---|---|---|---|
| 0028487 | 3/1981 | Japan | 359/884 |
| 448418 | 10/1974 | U.S.S.R. | 350/166 |
| 461398 | 2/1975 | U.S.S.R. | 350/166 |

OTHER PUBLICATIONS

Karolev et al, "High-Contrast Light ... Coatings", Jul. 1971, Opt. Spectrasc, vol. 31, #1.

Primary Examiner—Nelson Moskowitz
Attorney, Agent, or Firm—William J. Streeter; Wanda K. Denson-Low

[57] ABSTRACT

High reflectance mirror 40 for multiple wavelengths has substrate 42 which carries first reflector stack 46 for reflection of the principal, longer wavelength and a stack 66 which reflects shorter wavelength in an alignment beam. Semiconductor layer 64 separates passes the longer wavelength but reflects and/or absorbs the alignment beam of shorter wavelength. Layer 64 thus effectively optically decouples stacks 46 and 66. Each of the layers in the longer wave first reflecting stack 46 is of an optical thickness equal to an odd number of quarter wavelengths of the principal beam. The semiconductor layer 64 and the shorter wavelength reflecting an optical thickness equal to an even number of quarter wavelengths of the principal beam.

22 Claims, 3 Drawing Sheets

MIRROR FOR INFRARED AND VISIBLE WAVELENGTH RADIATION

TECHNICAL FIELD

This invention is directed to a mirror which has layers which provide efficient reflection in two different wavelength ranges.

BACKGROUND OF THE INVENTION

Advanced laser systems have a plurality of mirrors in the beam train. Misalignment can occur to produce pointing errors, particularly when the laser system operates in a nonvisible wavelength. In such systems, in order to achieve alignment, a beam at an alignment wavelength which is different than the principal wavelength can be used for alignment purposes. When the principal wavelength and alignment wavelength are different, pointing errors can occur because of nonuniformities in standard high reflectance coatings. When the beam at alignment wavelength reflects off a standard high reflectance plural coated mirror for the principal wavelength, interference effects cause the alignment beam to have an optical path difference which varies nonlinearly with the coating thickness. This nonlinear response causes distortions in the alignment beam at the alignment wavelength and, hence, causes pointing errors.

In order that the beam at alignment wavelength properly permits alignment of the optical system for the principal wavelength, a mirror, which is efficient and accurate for both the principal wavelength and the alignment beam wavelength, is necessary.

It is understood that Perkin-Elmer has created a multiple layer coating designed for reflection of plural wavelengths. The Perkin-Elmer design is specifically for use in a carbon dioxide laser resonator cavity and includes a visible reflector to align the mirrors, together with an infrared stack for the carbon dioxide laser infrared radiation. The substrate carries the infrared stack, and on top of that is a nickel layer. On top of the nickel layer is a stack of layers for the visible reflector. In the Perkin-Elmer design the nickel layer absorbs over quite a large band, including the carbon dioxide infrared laser frequency. The metal layer is incorporated to produce an etalon effect at 9.27 micrometers which gives a sharp reflectance peak. The coating was designed to lower the gain except at the wavelength of interest. The metal layer does not affect the reflectance or the optical path difference at the alignment wavelength. High absorption in the metal layer causes mirror damage at lower energy levels.

SUMMARY

In order to aid in the understanding of this invention, it can be stated in essentially summary form that it is directed to a mirror for the high efficiency reflection of two different wavelengths, one of which is a longer, principal wavelength and the other of which is a shorter wavelength which may be used for optical alignment purposes, the mirror being formed of two reflecting stacks. The lower stack next to the substrate is a reflector for the longer, principal wavelength. The next layer thereon is essentially one half wavelength thick at the longer wavelength and is chosen to be transparent at the longer wavelength but absorb the shorter wavelength. The upper reflector is a multilayer reflector for the shorter, alignment wavelength. The number of layers is chosen such that the total optical thickness of the outer reflector is also essentially one half wavelength thick at the longer wavelength.

It is, thus, a purpose and advantage of this invention to provide a mirror with high reflectance coatings for multiple wavelengths, including an intermediate layer to absorb the energy which was intended to be reflected by but was passed by the outer reflector to prevent that energy from going into the inner reflector. It is another purpose and advantage to provide a mirror whereby short wavelength alignment radiation can be reflected by the mirror in a long wavelength optical system to permit alignment of the optical elements to provide proper aiming of the optics for the long wavelength.

Further purposes and advantages of this invention will become apparent from the study of the following portion of this specification, the claims and the attached drawings.

DESCRIPTION OF THE PREFERRED EMBODIMENT

Figure 1:
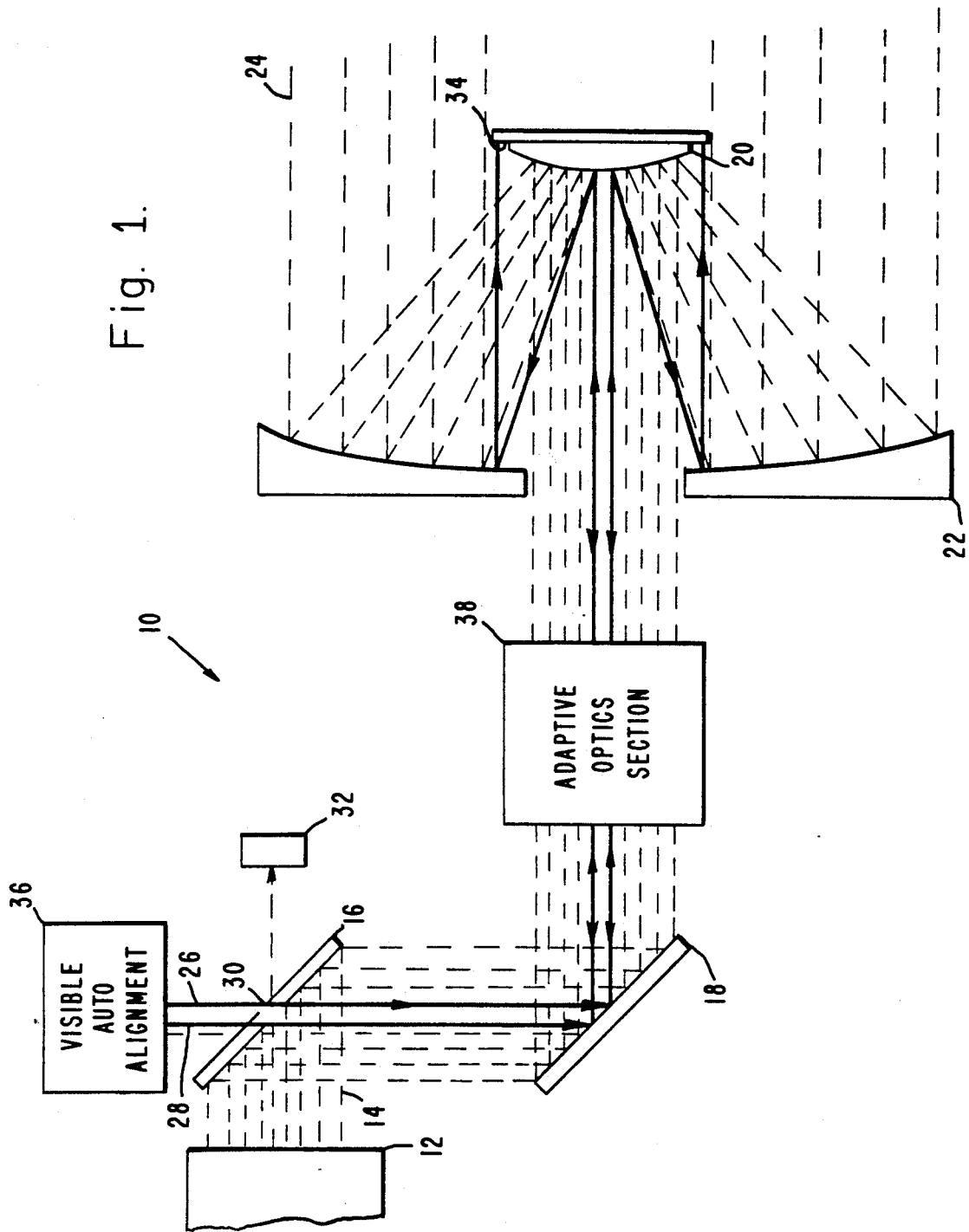
FIG. 1 is a schematic diagram of a simplified beam train of a long principal wavelength optical system which also incorporates a short wavelength optical element alignment system.

In order to fully understand the utilization of the mirror of this invention which has high reflectance for multiple wavelengths and a simplified optical beam train is illustrated at 10 in FIG. 1. Laser 12 produces beam 14 which is successively reflected off of folding mirrors 16, 18, secondary mirror 20 and primary mirror 22 to provide a signal beam 24 directed at a target. In the particular example, laser 12 is a chemical laser having a longer wavelength output at 3.8 micrometers in the infrared range. The beam train usually includes 5 to 10 folding mirrors, of which the mirrors 16 and 18 are an example. Furthermore, devices for modulating the beam 14 would probably include additional reflecting surfaces. These various mirrors need be properly aligned to accomplish their optical purposes. However, the long wavelength of the beam 14, which is the principal beam and is emitted from laser 12, prevents the resolution required for an alignment system. Therefore, a separate beam of shorter wavelength is provided for alignment purposes. In the present example, there are two alignment beams 26 and 28 in the visible wavelength, for example the light produced by a helium-neon laser at 0.6328 micrometers. These beams act together for alignment purposes and are on opposite sides of the center line of beam 14. The alignment beams 26 and 28 pass through an opening 30 in the first mirror 16. The portion of beam 14 which passes through opening 30 is absorbed in heat sink 32. Beams 26 and 28 travel with the principal beam 14 all the way through the optical train to stable reference mirror 34. Stable reference mirror 34 supports mirror 20 and is thus directly related thereto. Primary mirror 22 is also mounted on the stable support of reference mirror 34 so that the final portion of the main beam train does not need to be focused. From the stable reference mirror 34, the alignment beams travel back, through the optical system to the alignment equipment 36 at which they were produced. The alignment equipment 36 senses deviation in the alignment beam so that elements of the optical system between mirror 16 and mirror 34 can be adjusted. This adjustment may be manually or automatically made. Thus, the alignment equipment 36 provides a source for the alignment beams in the form of a laser of appropriate wavelength, sensors for the returning signal and indications of the state of alignment. These indications may automatically or otherwise cause adjustment of the optics in the beam line to maintain alignment.

Along the path of the alignment beam, the alignment beam may reflect on as many as twenty surfaces. These surfaces are coated to give high reflectance at the principal wavelength. Without special treatment, the reflectance of such surfaces at the visible wavelength of the alignment beam could be as low as 75%. If this were the case for all of the mirrors, the returning alignment beam energy would only be 0.3% of the original alignment beam energy. An improvment in the reflectivity at the alignment beam wavelength would permit a better signal to noise ratio and would permit the use of a smaller laser for producing the alignment beam.

In such alignment systems it is assumed that the alignment beam and the principal beam are at all times parallel, after the first principal beam folding mirror 16. However, if the standard mirror coatings had nonuniformities such as coating run-off toward the edges, the alignment beam and the principal beam would diverge and the principal beam would point in the wrong direction.

In a structure where both the longer and shorter wavelength beams are reflected by the same stack of layers, the phase change, upon reflection, of the short wavelength beam changes rapidly with small changes in coating thickness of the reflector for the long wavelength beam. Thus, one portion of the beam experiences a particular phase change $\phi$ upon reflection, while a nearby portion may experience a phase change of twice that amount, and such changes may vary across the entire mirror. The collimated plane wave beam is thus highly aberated and the aberation introduces pointing errors. In the present structure the layer, which is opaque to the shorter wavelength, completely decouples the short wavelength beam from the long wavelength beam. By the very nature of the short wavelength reflector design, the previously described phase change $\phi$ is now acceptable.

In a structure where the short wavelength beam passes through the long wavelength reflector, the only way to control the phase is by control of the thickness of the long wavelength reflector layers, and such thickness control is beyond the present state of the art.

The beam chain may include adaptive optics generally indicated at 38. These adaptive optics are used to obtain a flat wavefront and, hence, a good focus. Standard mirror coatings for the long wavelength beam 14 introduce a difference between the wavefront of the principal and alignment beams. This error is in addition to the pointing error described above. Thus, when the adaptive optics 38 adjust in accordance with the signal produced by the alignment beam, to produce a flat wavefront, such adjustment can actually degrade the wave front of the long wavelength principal beam. Again the opaque layer eliminates this problem by completely decoupling the short wavelength beam from the long wavelength reflector. Such degradation produces poor focus and lower power at the receiving point of the signal beam 24. A suitable mirror coating is required for reflecting both the principal beam and the alignment beam in the same manner so that the alignment beam properly represents the principal beam and the alignment beam returns with sufficient energy for proper alignment purposes.

Mirror 40 is illustrative of the several mirrors in the beam train 10 which must reflect both the principal longer wavelength beam and the alignment beam. Mirror 40 has a substrate 42 which serves as a mechanical support for the mirror coatings, and the substrate may be cooled to remove heat dissipated in the mirror 40 in high energy installations. A first layer 44 of silver is provided to surface the substrate and is not a principal part of the reflector. Layer 44 is 200 angstroms thick. The principal reflector 46 is made up of a stack of eight layers of alternately (from bottom to top) of low index and high index of refraction material. For example, layers 48, 50, 52 and 54 are each layers of low index of refraction materials such as, preferably, of thorium tetrafluoride of a quarter-wave optical thickness of the wavelength of the principal beam. One quarter wave of optical thickness is preferred, but the optical thickness of the reflective layers may be any odd number of quarter waves, i.e. $\frac{1}{4}$, $\frac{3}{4}$, 5/4, etc. to be effective. Other suitable materials are sapphire, magnesium fluoride, etc. The alternate layers 56, 58, 60 and 62 are of a material which is of a higher index of refraction for the particular wavelength, for example zinc sulfide. These layers are also of an odd number of quarter wavelengths in optical thickness of the wavelength of the principal beam. Other suitable materials are zinc selenide, silicon, etc. These materials of lower and higher index of refraction materials are those presently preferred for high energy mirrors. Other materials of relatively low and relatively high index of refraction can be used together, depending on availability and wavelength requirements. The optical thickness of each layer is the physical thickness times the index of refraction. Each layer of the stack 46 has an optical thickness substantially equal to an odd number of quarter wavelengths of the principal beam. This can be expressed as:

$$\eta_h t_h = \eta_l t_l = \lambda_p\, n/4$$

where
 $\eta$—index of refraction
 h—high index material
 l—low index material
 $\lambda_p$—wavelength of principal beam
 $\eta$—is any odd integer The stack 46 is thus an eight layer reflector suitable for the wavelength of principal beam 14.

A critical layer of the mirror 40 is the layer 64 of semiconductor material. The semiconductor is chosen of a material which will be transparent at the wavelength of the principal beam 14 and will be opaque at the wavelength of the alignment beams 26 and 28. Layer 64 is a decoupling layer which is visibly opaque to effectively decouple the long wave reflective stack 46 from the short wave reflective stack 66 on top of decoupling layer 54. A preferred material for the decoupling layer 64 is germanium. Other suitable materials for the wavelength of the illustrated embodiment are cadmium telluride, silicon, and other semiconductors.

Versatility of this high reflectance mirror 40 for multiple wavelengths is possible because a semiconductor can be selected in accordance with the two wavelengths of the system. The semiconductor is chosen with a band gap between the two wavelengths. For example, a cadmium telluride semiconductor layer could be used in a system using an iodine laser at 1.3 micrometers as the principal beam, and employing a helium-neon alignment laser. In the present preferred embodiment, with a 3.8 micrometer wavelength for the principal beam and a helium-neon alignment laser with a shorter wavelength, germanium is a suitable semiconductor layer. The decoupling layer 64 is one half optical wavelength thick when considering the wavelength of the principal beam 14. While an optical thickness of a half wavelength is preferred, the optical thickness can be any even number of quarter wavelengths (i.e.: 2/4, 4/11, 6/4, etc.) and be effective.

Figure 2:
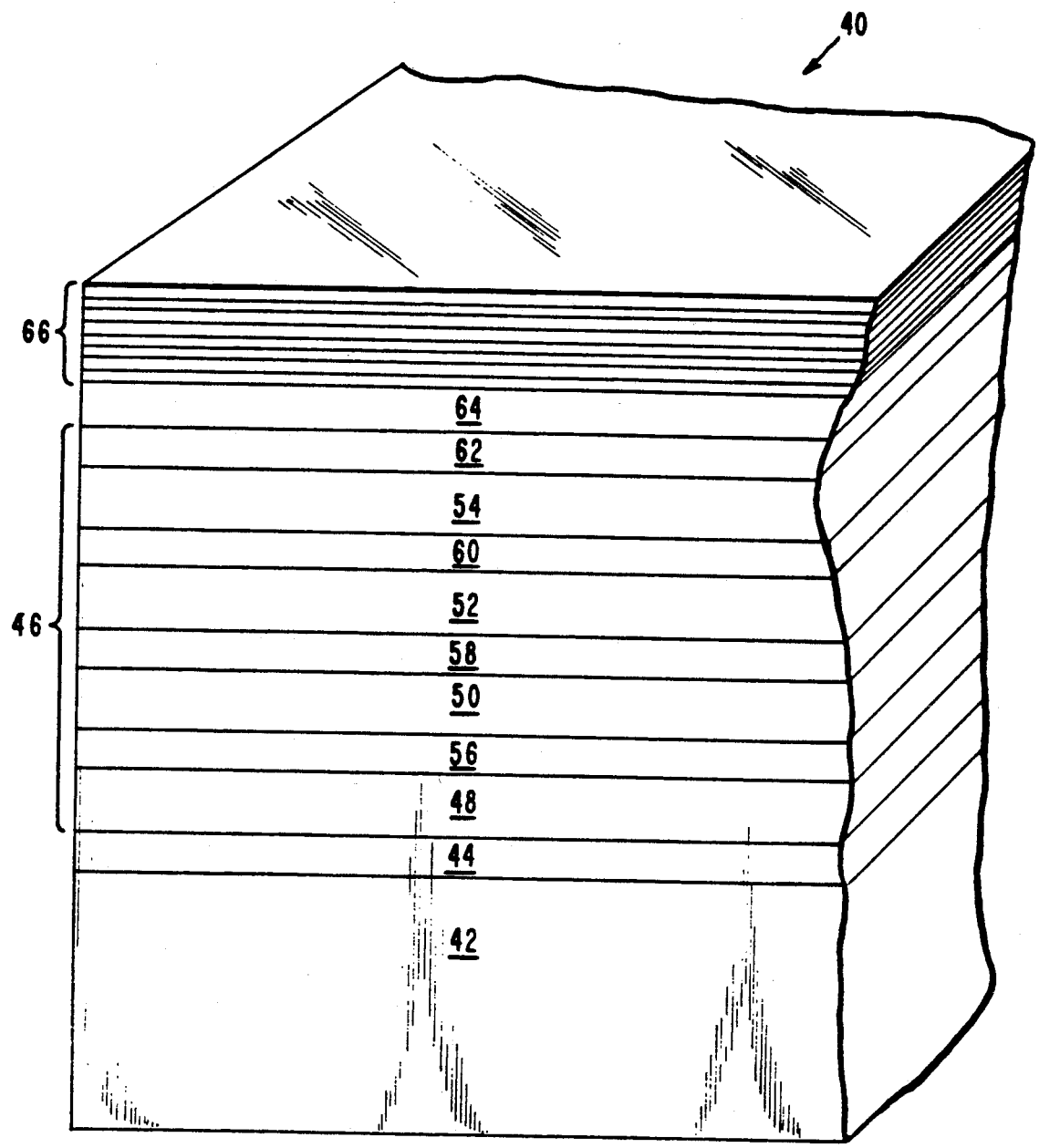
FIG. 2 is a diagram showing the layers on the mirror in accordance with this invention.

Reflective stack 66 is made up of stack of a plurality of alternating layers. Such layers are indicated in FIG. 2, and in view of the small thickness of these layers, they are not individually identified. Each of the layers in reflecting stack 66 is of an optical thickness equal to a quarter wavelength of the alignment beam. One quarter wave of optical thickness is preferred, but the optical thickness of the reflective layers may be any odd number of quarter waves, i.e. ¼, ¾, 5/4, etc., and be effective. The layer in stack 66 closest to decoupling layer 64 is of low index of refraction, such as thorium tetrafluoride, sapphire or magnesium fluoride, while the next layer thereabove is of high index of refraction, such as zinc sulfide, zinc selenide or silicon. Eight such layers alternate in the alignment beam reflecting stack 66. The thickness of each layer in stack 66 is such that its physical thickness times its index of refraction (its optical thickness) is substantially equal to a quarter wavelength of the alignment beams. Above the top layer of the reflecting stack 66 is air. The stack 66 thus has a high efficiency for reflection at the wavelength of the alignment beam. The small amount of energy in the alignment beam which is not reflected by the reflecting stack 66 is absorbed in decoupling layer 64, which is opaque to that wavelength. In addition, the total optical thickness of the reflecting stack 66 is also approximately a half wavelength at the wavelength of the principal beam 14. While an optical thickness of a half wavelength is preferred, the optical thickness can be any even number of quarter wavelengths (i.e.: 2/4, 4/4, 6/4, etc.) and be effective. By making the absorbing layer 64 and the total short wavelength reflecting stack 66 each about an even number of quarter wavelengths in optical thickness at the principal wavelength, it is as if they are not present with respect to the reflectance and/or aborptance of the principal beam. Varying the thickness of the absorbing layer 64 and a number of layers in the reflecting stack 66 is used to achieve the half wavelength optical thickness for each.

Figure 3:
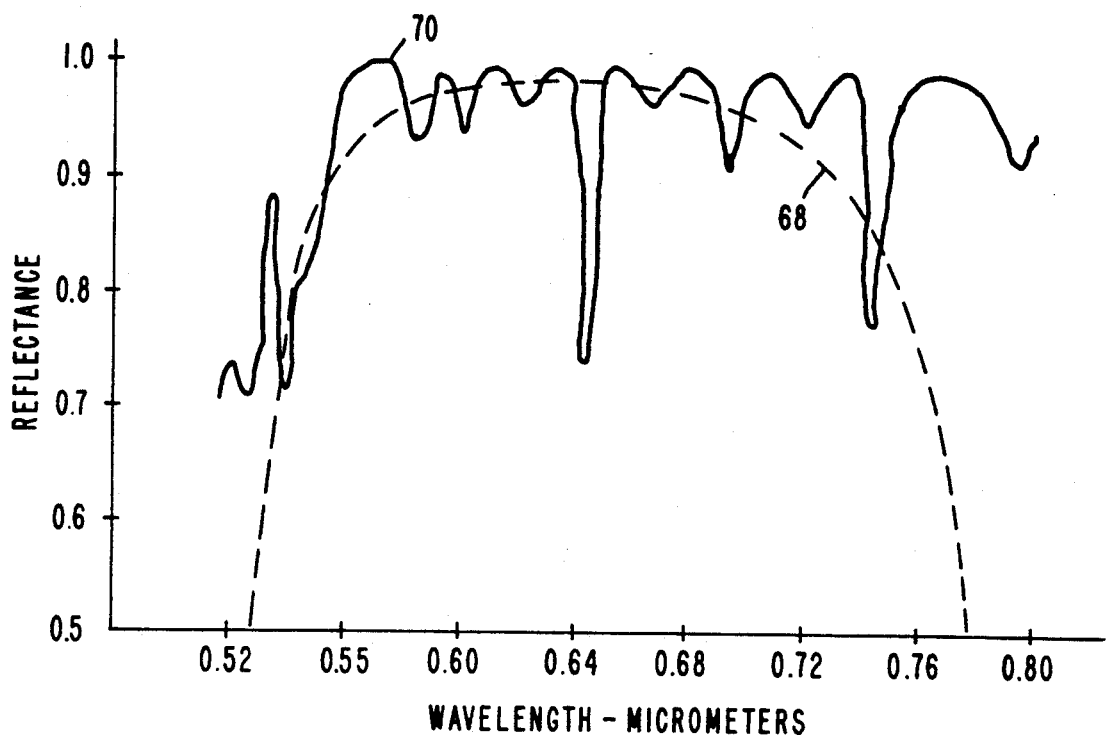
FIG. 3 is a reflectance diagram showing short wavelength reflectance of a mirror in accordance with this invention, as compared with other structure.
Figure 4:
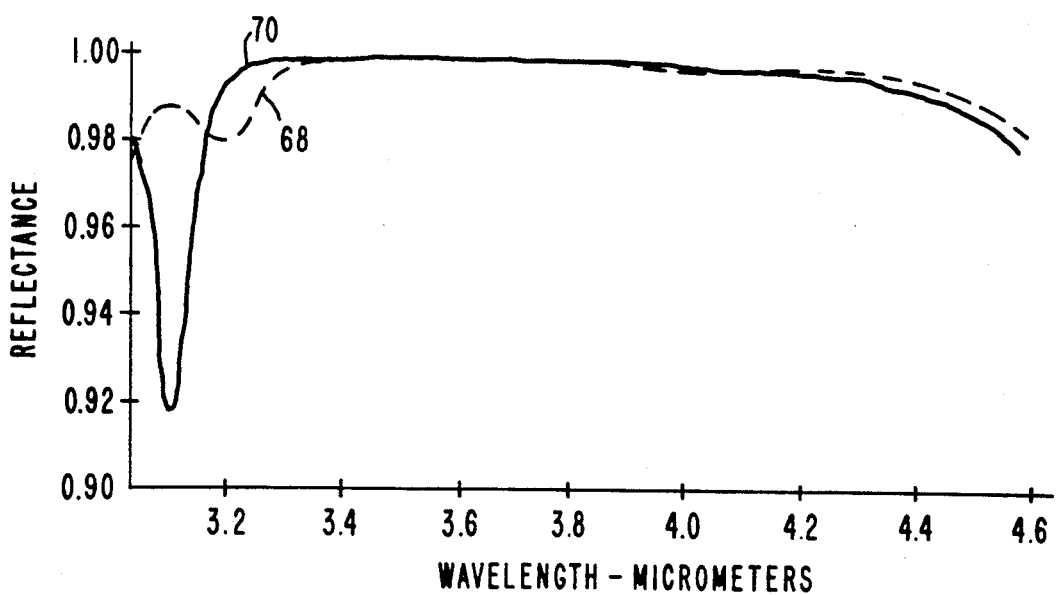
FIG. 4 is a reflectance diagram showing the long wavelength reflectance of the mirror in accordance with this invention, as compared to other mirror structure.

FIG. 3 is a computer drawn graph of the reflectance versus wavelength (in computer simulation) of the short wavelength reflectance of the mirror stack 66 of this invention shown on dotted line 68. A similar structure without the semiconductor layer is indicated by the line 70. It can be seen that the semiconductor layer smooths out the visible reflectance. FIG. 4 shows the reflectance versus wavelength for the same two designs at a longer wavelength. It can be seen that the inclusion of the semiconductor layer has little effect on reflectance in the 3.8 micron wavelenth region of the example.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A high reflectance mirror for at least first and second beams of respective longer and shorter wavelengths comprising:
   a substrate;
   a first plurality of layers on said substrate defining a first reflector for the longer wavelength first beam;
   a second plurality of layers of reflector material defining a second reflector for the shorter wavelength second beam; and
   a semiconductor layer positioned between said first and second plurality of layers, said semiconductor layer comprising material which is substantially transparent to the first beam and substantially opaque to the second beam effectively to optically decouple said first and second plurality of layers.

2. The high reflectance mirror for multiple wavelengths of claim 1 wherein the optical thickness of each of said layers in said first reflector for reflecting the first beam is substantially an odd number of quarter wavelengths of the first beam.

3. The high reflectance mirror for multiple wavelengths in accordance with claim 1 wherein said semiconductor layer has an optical thickness substantially equal to an even number of quarter wavelengths of the first beam.

4. The high reflectance mirror for multiple wavelengths in accordance with claim 2 wherein said semiconductor layer has an optical thickness substantially equal to an even number of quarter wavelengths of the first beam.

5. The high reflectance mirror for multiple wavelengths of claim 1 wherein said stack of layers for the reflectance of the second beam is formed with each layer having an optical thickness substantially equal to an odd number of quarter wavelengths of the second beam and said stack has a total optical thickness substantially an even number of quarter wavelengths of the first beam.

6. The high reflectance mirror for multiple wavelengths of claim 2 wherein said stack of layers for the reflectance of the second beam is formed with each layer having an optical thickness substantially equal to an odd number of quarter wavelengths of the second beam and said stack has a total optical thickness substantially an even number of quarter wavelengths of the first beam.

7. The high reflectance mirror for multiple wavelengths of claim 3 wherein said stack of layers for the reflectance of the second beam is formed with each layer having an optical thickness substantially equal to an odd number of quarter wavelengths of the second beam and said stack has a total optical thickness substantially an even number of quarter wavelengths of the first beam.

8. The high reflectance mirror for multiple wavelengths of claim 4 wherein said stack of layers for the reflectance of the alignment second beam is formed with each layer having an optical thickness substantially equal to an odd number of quarter wavelengths of the alignment beam and said stack has a total optical thickness substantially an even number of quarter wavelengths of the first beam.

9. The high reflectance mirror for multiple wavelengths in accordance with claim 1 wherein said semiconductor layer is of a material which has a band gap at a wavelength between that of the first and second beams, said semiconductor being transparent at the wavelength of the first beam and opaque at the wavelength of the second beam.

10. The high reflectance mirror for multiple wavelengths in accordance with claim 4 wherein said semiconductor layer is of a material which has a band gap at a wavelength between that of the first and second beams, said semiconductor being transparent at the wavelength of the first beam and opaque at the wavelength of the second beam.

11. The high reflectance mirror for multiple wavelengths in accordance with claim 10 wherein said semiconductor layer is selected from the group consisting of germanium, cadmium telluride and silicon.

12. The high reflectance mirror for multiple wavelengths in accordance with claim 5 wherein said semiconductor layer is of a material which has a band gap at a wavelength between that of the first and second beams, said semiconductor being transparent at the wavelength of the first beam and opaque at the wavelength of the second beam.

13. The high reflectance mirror for multiple wavelengths in accordance with claim 8 wherein said semiconductor layer is of a material which has a band gap at a wavelength between that of the first and second beams,, said semiconductor being transparent at the wavelength of the first beam and opaque at the wavelength of the second beam.

14. The high reflectance mirror for multiple wavelengths in accordance with claim 9 wherein said second plurality of layers for the reflectance of the second beam is selected from the group of high index of refraction materials consisting of zinc sulfide, zinc selenide and silicon and is selected from the group of low index of refraction materials consisting of thorium tetrafluoride, sapphire and magnesium fluoride.

15. The high reflectance mirror for multiple wavelengths in accordance with claim 9 wherein said first plurality of layers for the reflectance of the first beam is selected from the group of high index of refraction materials consisting of zinc sulfide, zinc selenide and silicon and is selected from the group of low index of refraction materials consisting of thorium tetrafluoride, sapphire and magnesium fluoride.

16. A process of separating mixed optical radiation which contains radiation in both a longer wavelength band and a shorter wavelength band comprising the steps of:

directing the mixed radiation onto a mirror having a first set of stacked layers supported on a substrate, and a second layer and a third set of stacked layers on said first set;

forming the first set, second layer and third set of materials of different reflectivity and absorptivity vis-a-vis different wavelengths of the mixed radiation;

passing the longer wavelength radiation substantially through the third set and second layer so that the longer wavelength radiation reflects in the first set; and reflecting the shorter wavelength radiation in the third set and absorbing in the second layer that portion of the shorter wavelength radiation which is not reflected in the third set, the second layer thereby effectively decoupling the first and third sets.

17. The process of claim 16 wherein the step of forming the second layer includes forming it of a semiconductor material which passes the radiation of longer wavelength but reflects and/or absorbs the radiation of shorter wavelength.

18. The process of claim 16 wherein the step of forming the first set of layers includes forming each of the layers in the first set of layers to have an optical thickness substantially equal to an odd number of quarter wavelengths of the longer wavelength beam.

19. The process of claim 16 wherein the step of forming the third set and second layers includes the step of forming each to have an optical thickness substantially equal to an even number of quarter wavelengths of the longer wavelength beam.

20. The high reflectance mirror according to claim 1 in which the second beam comprises an alignment beam.

21. A reflecting device decoupling radiation of at least first and second wavelengths comprising:

first means for reflecting the first wavelength radiation;

second means for reflecting the second wavelength radiation; and third means both for absorbing the first wavelength radiation and for transmitting the second wavelength radiation.

22. A device according to claim 21 in which said first, second and third means are placed in a sandwich arrangement, with said third means separating said first and second means.

* * * * *